United States Patent [19]

Rudi

[11] Patent Number: 4,866,548
[45] Date of Patent: Sep. 12, 1989

[54] METHOD AND ARRANGEMENT FOR PRECISE POSITIONING OF A MAGNETIC HEAD TO VARIOUS TRACKS OF A MAGNETIC TAPE

[75] Inventor: Guttorm Rudi, Fjellhamar, Norway

[73] Assignee: Tandberg Data A/S, Oslo, Norway

[21] Appl. No.: 85,375

[22] Filed: Aug. 14, 1987

[30] Foreign Application Priority Data

Dec. 22, 1986 [DE] Fed. Rep. of Germany ....... 3644005

[51] Int. Cl.⁴ ............................ G11B 5/56; G11B 5/55
[52] U.S. Cl. .................................. 360/77.02; 360/75; 360/78.02; 360/74.1
[58] Field of Search ..................... 360/75–78, 360/106, 107, 109, 74.1, 77.12, 77.01, 78.02, 78.01

[56] References Cited

U.S. PATENT DOCUMENTS

| | | | |
|---|---|---|---|
| 3,292,168 | 12/1966 | Gray | 360/77.12 |
| 3,541,270 | 11/1970 | Walther | 360/77.01 |
| 4,313,141 | 1/1982 | Yanagida et al. | 360/78 |
| 4,476,503 | 10/1984 | Solhjell | 360/75 |
| 4,563,713 | 1/1986 | Cahoon et al. | 360/75 |
| 4,609,959 | 9/1986 | Rudi | 360/106 |
| 4,679,104 | 7/1987 | Dahlerud | 360/78 |

FOREIGN PATENT DOCUMENTS 59-185020  10/1984  Japan ........................................ 360/78

OTHER PUBLICATIONS

Patent Abstracts of Japan, vol. 9, No. 48, (P-388) [1771], Feb. 28, 1985; & JP-A-59 185 020, (Sony KK), 20-10-1984.
IBM Technical Disclosure Bulletin, vol. 17, No. 1, Jun. 1974, pp. 217 and 218, Schwarz.
Patent Abstract of Japan, vol. 9, No. 83, (P-348), Apr. 12, 1985 & JP-A-59 213 070, (Sankivou Seiki Seisakusho KK) 01-12-14 1984.

*Primary Examiner*—Alan Faber
*Assistant Examiner*—Steven R. Garland
*Attorney, Agent, or Firm*—Hill, Van Santen, Steadman & Simpson

[57] ABSTRACT

For precise positioning of a magnetic head to various tracks of a magnetic tape, deviations occur as a consequence of manufacturing tolerances of the magnetic head, or as a consequence of the adjustment thereof. Correction values are identified wherein a read head identifies a center of a track recorded by a write head. A moving direction of the magnetic tape is reversed and the center of the track is identified again. The read head identifies the center of a track recorded by a neighboring write head. Positional values allocated to the center of the tracks are subtracted from the positional value of the write head.

5 Claims, 2 Drawing Sheets

METHOD AND ARRANGEMENT FOR PRECISE POSITIONING OF A MAGNETIC HEAD TO VARIOUS TRACKS OF A MAGNETIC TAPE

BACKGROUND OF THE INVENTION

1. Field of the Invention:

The invention is directed to a method for precise positioning of a magnetic head to various tracks of a magnetic tape in a magnetic tape recorder wherein the magnetic head is displaceable back and forth perpendicular to the moving direction of the magnetic tape for positioning to the various tracks, and wherein the magnetic head has at least one write head and one allocated read head. The invention is also directed to an arrangement for the implementation of the method.

2. Description of the Prior Art:

German published application No. 32 44 149 discloses an arrangement for positioning a magnetic head to various tracks of a magnetic tape wherein the magnetic tape is accommodated in a cassette which is inserted into the magnetic tape recorder means in a longitudinal direction. The magnetic tape is moved in a longitudinal direction by use of a tape drive roller, and the recording on a plurality of parallel tracks occurs by use of a magnetic head. For example, the magnetic head is provided with two write/read heads arranged above one another and the recording occurs in four parallel tracks. The magnetic head is positioned to the various tracks by use of a positioning means. The positioning means contains an electric motor designed as a stepping motor at which a worm gearing is arranged. This worm gear cooperates with a screw gearing via which a magnetic head carrier accepting the magnetic head is displaced perpendicular to the moving direction of the magnetic tape.

Although precise component parts are employed for the positioning means, a deviation of a write/read head from the exact center of a track is possible when the magnetic head is positioned to the outer tracks. In magnetic tape recorders having a low number of tracks, this deviation presents no difficulties in recording or playback of data signals. When, however, the number of tracks on the same magnetic tape is increased, such deviations cannot be accepted.

European patent application No. 86100172.5 discloses a method wherein the mechanical tolerances of the positioning means are compensated such that the precise positions of a write head or read head to the centers of the tracks on the magnetic tape are identified during a measuring event on the basis of a positioning to at least one track. The identified positions are assigned position values for the electric motor which are then taken into consideration during normal operation of the magnetic tape recorder. In this known method, however, only position values which occur due to tolerances in the positioning means are identified.

However, other deviations which are not covered by the known method can arise in magnetic heads and in their adjustment. The magnetic head shown in FIG. 1 is adjusted in a magnetic tape recorder in the ideal case such that column lines G1 and G2 which proceed perpendicular to the moving direction of a magnetic tape (not shown) are also exactly perpendicular to a reference plane B which, for example, can be the base plate of a cassette accepting the magnetic tape. The magnetic head 1 contains two write heads W and W1, and contains two read heads R or R1 allocated thereto which should be arranged at a rated distance D from one another. However, this distance D is not always precisely observed during manufacture of the magnetic heads, so that the actual distance amounts to $D+a$, whereby a can be positive or negative. In a recording with the write head W, the tape as indicated by an arrow is moved from right to left, whereas the magnetic tape is moved from left to right given recording with the write head W1. The write head W or W1 can be arranged offset in a perpendicular direction with respect to the moving direction of the magnetic tape with reference to the read head R or R1 as a consequence of manufacturing tolerances, mainly by a value b or b1, both of which can likewise be positive or negative. The result thereof is that the tracks do not always lie precisely in the center of the read heads R or R1 given a recording with the write heads W or W1.

It is also assumed in the illustration in FIG. 2 that the magnetic head 1 can be arranged turned by an angle alpha relative to the reference surface B. For reasons of clarity, this angle has been shown exaggerated in size in FIG. 2. This turning is likewise expressed in an offset c or c1 of the write heads W or W1 relative to the read heads R or R1.

A further offset of the tracks can occur since the magnetic tape within the guideposts of the magnetic tape recorder or of the cassette shifts perpendicular to the running direction of the magnetic tape dependent on this running direction.

These different positions of the tracks during writing and during reading are not taken into consideration by the known method.

SUMMARY OF THE INVENTION

It is an object of the invention to specify a method and an arrangement given the employment of which a precise positioning of the magnetic head to various tracks of the magnetic tape is also possible when the magnetic head has small imprecisions in the arrangement of at least one write head and of a corresponding read head, and, under given conditions, is likewise not precisely adjusted.

In the method of the type initially cited, this object is achieved by recording signals in one track by use of the write head on the moving magnetic tape without having the write head moving. A first positional value of the magnetic head is stored. By use of the read head, a center of said one track is identified by moving the magnetic head perpendicular to a moving direction of the magnetic tape. A corresponding second positional value of the magnetic head is identified. A first correction value is identified from a difference of the first and second positional values. The first correction value is utilized for positioning the magnetic head to the various tracks.

DESCRIPTION OF THE PREFERRED EMBODIMENTS

Figure 3:
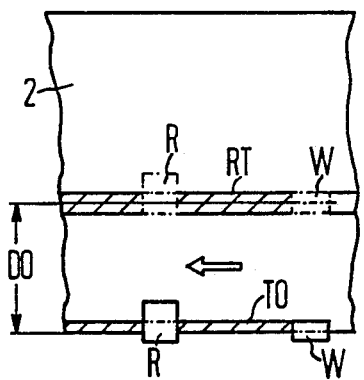
FIG. 3 is an illustration of a recording of a reference track on a magnetic tape by use of a narrow write head and of a broad read head.
Figure 4:
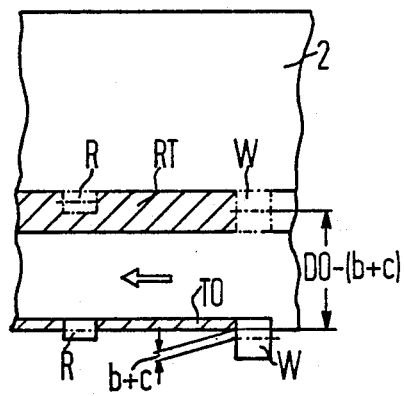
FIG. 4 is an illustration of a recording of a reference track on a magnetic tape by use of a broad write head and of a narrow read head.

In the illustrations shown in FIGS. 3 and 4, a reference track RT is recorded on a magnetic tape 2 by use of the edge of the magnetic tape 2 as a reference straight line. First, as disclosed, for example, in U.S. Pat. No. 4,476,503, incorporated herein by reference, the edge of the magnetic tape 2 is identified, whereby the magnetic head 1 is moved perpendicular to the moving direction of the magnetic tape 2 until the write head W no longer contacts the magnetic tape. It is then moved in the opposite direction while it is simultaneously receiving write signals As long as the write head W does not come into contact with the magnetic tape 2, no signals are recorded thereon. The read head R, which in the exemplary embodiment of FIG. 3 is fashioned as a broad read head, likewise generates no read signals. As soon, however, as the write head W comes to lie above the magnetic tape 2 and a track TO is recorded in increasing width, the read head R recognizes this track TO and, dependent on a threshold, the edge of the magnetic tape 2 is recognized given a corresponding width of the track TO. Subsequently, the write head W is moved into a position by a distance DO by means of a corresponding plurality of control signals to the electric motor of the positioning means fashioned as a stepping motor. This position is shown with broken lines in FIG. 3, and the write head W records the reference track RT on the magnetic tape 2.

When, as shown in FIG. 4, the write head W is designed broad and the read head R is designed narrow in order to be able to overwrite data, the read head R given a same width of the track TO, already recognizes the edge of the magnetic tape 2 when, given an offset between the two heads of b+c, the center of the write head W is not yet situated at the edge of the magnetic tape 2. When the magnetic head 1 is then moved by the same distance DO and the reference track RT is recorded, it is recorded in offset fashion on the magnetic tape 2 by the value b+c, referred to below as a first correction value. The analogous case applies when the write head W is offset relative to the read head R in the other direction. In this case, the read head W is already situated on the magnetic tape 2 before the read head R recognizes the track TO.

In the case of a broad write head W and narrow read head R, the first correction value b+c must be taken into consideration for the precise recording of the reference track RT.

Figure 5:
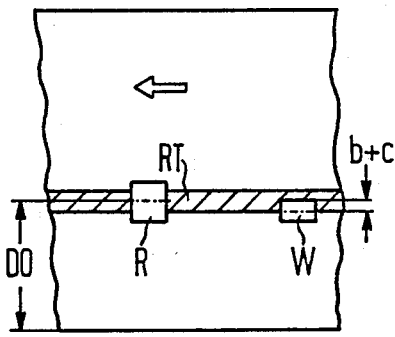
FIG. 5 is an illustration of an identification of a track recorded by a narrow write head by a broad read head.
Figure 6:
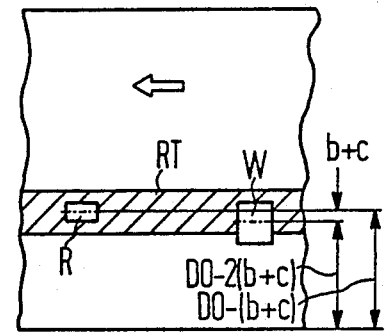
FIG. 6 is an illustration of an identification of the center of a track recorded with a broad write head by means of a narrow read head.

FIGS. 5 and 6 show the case wherein the center of the reference track RT must be precisely located for reading the reference track RT, or for the recording of further tracks at prescribed distances from the reference track RT. This occurs, since, by use of the read head R, the two edges of the reference track RT are identified and the mean value of the positional values at the edges of the reference track RT is then formed in order to identify the positional value of the center of the reference track RT. This positional value deviates from the positional value of the write head W during recording of the reference track RT by the correction value b+c, so that the correction value b+c can be identified in a simple way from the difference of the two positional values. It is not necessary to employ the reference track RT for the identification of the correct value b+c. Rather, this can occur after every recording of an arbitrary track on the basis of the write head W when the positional value of the write head W during recording is stored and the center of the recorded track is subsequently identified by means of the read head, and the positional value allocated to the center is compared to the positional value of the write head W when recording the track. In the illustration of FIG. 5, we again proceed on the basis of a narrow write head W and a broad read head R.

When a broad write head W and a narrow read head R are employed and the center of the reference track RT is identified in the same way as in FIG. 5, the write head W comprises the distance DO minus 2 (b+c) from the edge of the magnetic tape 2, whereas the read head R comprises the distance D minus (b+c) from the edge. The correction value b+c can again be identified from the difference of the positional values of the read head R and of the write head W.

Here, too, it is not necessary to employ the reference track RT for the identification of the correction value b+c. Rather, any other track can be employed when the positional value during writing by the write head W and that of the read head R are compared to one another after identification of the center of the track.

It is also possible given both a narrow write head W and a broad read head R as well as given a broad write head W and a narrow read head R to identify the variation in the position of the magnetic tape 2 dependent on the moving direction. For this purpose, the center of the track is again identified by the read head R after the recording of a track by the write head W and after storing of its positional value. Subsequently, the moving direction of the magnetic tape 2 is reversed and the center of the track is again identified by the read head R. The lateral shift dependent on the moving direction is identified as a second correction value from the difference in the positional values allocated to the centers of the track.

Only one respective head system formed of a write head W and a read head R is required in a magnetic head for the implementation of the method shown in FIGS. 3 through 6. When, however, a plurality of head systems are provided in the magnetic head 1, the first correction values b1+c1 allocated to the other head systems can be identified in a corresponding way.

It is also possible to identify the distance D+a with the assistance of this method, this distance indicating the distance between the two head systems.

Figure 1:
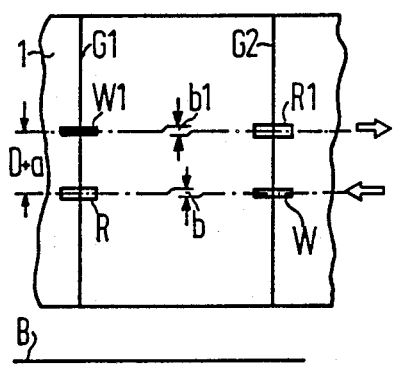
FIG. 1 is a schematic illustration of a magnetic head.
Figure 2:
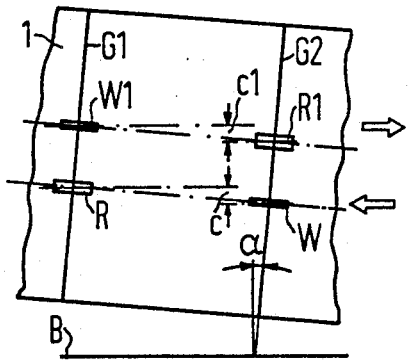
FIG. 2 is a schematic illustration of a magnetic head having an angle of inclination relative to a reference surface.
Figure 7:
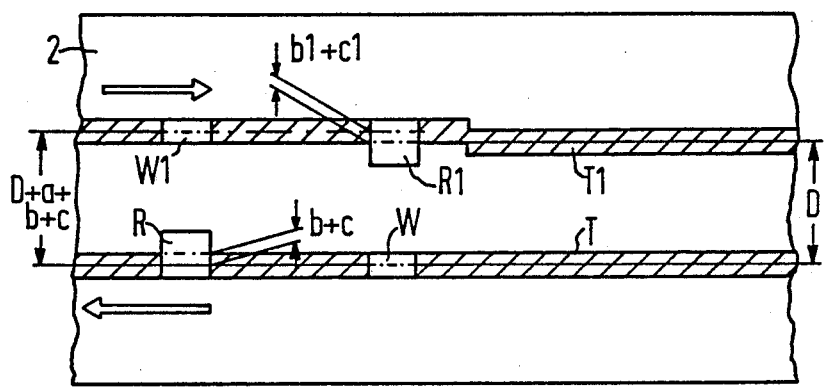
FIG. 7 is a corrected recording of tracks on a magnetic tape.

In the illustration in FIG. 7, two head systems are present in accordance with FIGS. 1 and 2, these being formed of the write head W and the read head R, or of the write head W1 and the read head R1. In order to now permit a precise recording of first and second tracks T and T1 on the magnetic tape 2 as well as an exact playback, the correction values b+c or b1+c1 are first identified in accordance with the methods shown in FIGS. 5 and 6. Subsequently, the moving direction of the magnetic tape 2 can be reversed and the second correction value can be identified. This indicates the lateral offset of the magnetic tape 2 dependent on the moving direction. This can occur by use of one read head R or of both read heads R and R1, whereby the identified, second correction values may then be potentially averaged. For the identification of a, the read head R after its exact positional value at the center of the track T has been stored is subsequently moved to the center of the track T1', and the value D+a+(b+c) derives from the difference of the two positional values. Since the rated distance D of the two head systems is known and the correction values b+c is also known, a can be identified in a simple way and all three correction values can be taken into consideration when recording the track T1, so that this is recorded exactly at a distance D from the track T. In a corresponding way, the correction values can be taken into consideration when reading the data.

Figure 8:
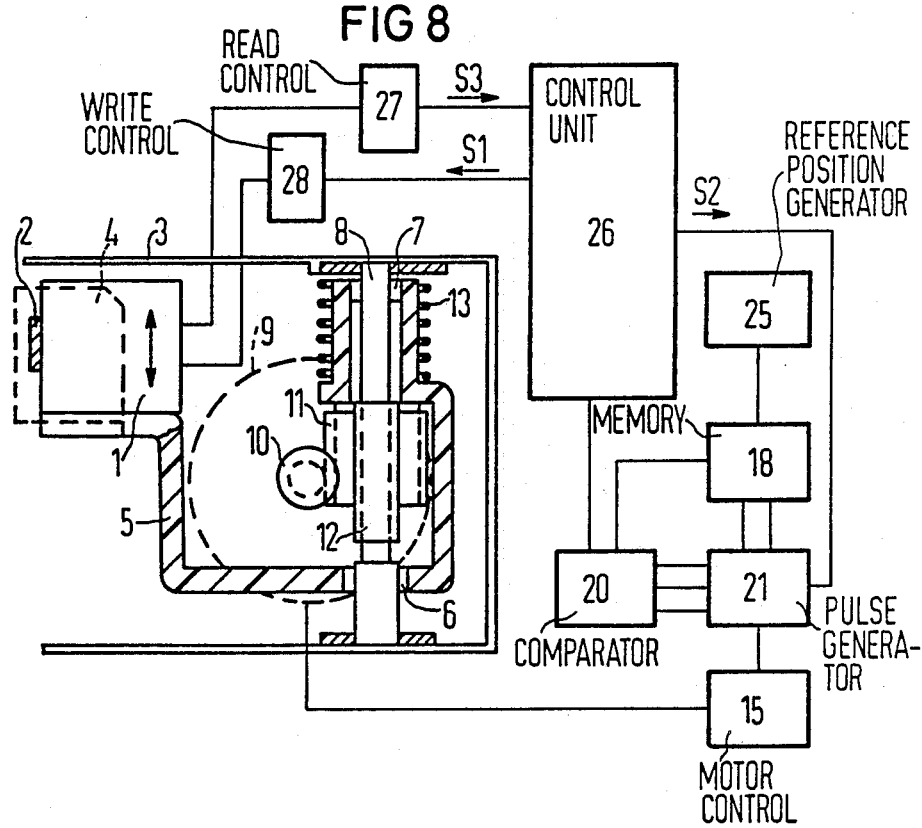
FIG. 8 is a block circuit diagram of an arrangement for the implementation of the method.

The arrangement shown in FIG. 8 for the implementation of the method shows a portion of a magnetic tape recorder which is designed as a cassette magnetic tape recorder. Such a cassette magnetic tape recorder may be derived, for example, from German published application No. 32 44 165 or from German published application No. 32 44 149. A drive arrangement (not shown) for a magnetic tape 2 and a positioning means for the magnetic head 1 are arranged in a housing 3 of the cassette magnetic tape recorder in order to position the write heads W or W1 and the read heads R or R1 of the magnetic head to different tracks of the magnetic tape 2. A magnetic tape cassette 4 shown with broken lines and having the magnetic tape 2 can be inserted into the magnetic tape recorder. During operation of the magnetic tape recorder, the magnetic head 1 engages into an opening of the cassette 2. The magnetic head 1 is secured to a head carrier 5 and is displaceable along an axis 8 in a transverse direction of the magnetic tape 2, together with this head carrier 5, by use of two bearings 6 and 7.

The displacement of the magnetic head 1 occurs by use of an electric motor 9 which is preferably fashioned as a stepping motor, but which can also be fashioned as a DC motor. A worm 10 is secured to the shaft of the motor 9, this worm 10 being in an interactive relationship with a worm wheel 11. In the region of the worm wheel 11, the shaft 8 has an outside thread 12 which is in an interactive relationship with an inside thread of the worm wheel 11. When the worm 10 turns, the worm wheel 11 is driven, so that it moves in an axial direction of the shaft 8. A compression spring 13 presses the head carrier 5 against the worm wheel 11, so that this head carrier 5 can follow the movement of the worm wheel 11 in the axial direction, and thus the magnetic head 1 is positioned to various tracks of the magnetic tape 2. The head carrier 5 is prevented from turning together with the rotation of the worm wheel 11 during the motion of the head carrier 5 in the axial direction of the shaft 8. During the insertion or removal of the cassette 4, the magnetic head 1 is pivotable in common with the head carrier 5, but from the working position into its idle position. The motor 9 receives control signals from a motor control 15, these control signals, for example, being fashioned as stepping pulses when the motor 9 is a stepping motor. The motor control 15 is driven by a pulse generator 21 which, when positioning a write-/read head in the magnetic head 1 to a specific track of the magnetic tape 2, receives the control signals in order to proceed from an actual position, for example the position of a specific track, to a rated position, for example to another track. Such a positioning is universally known and may be derived, for example, from U.S. Pat. No. 4,313,141, incorporated herein by reference.

A specific track is communicated from a central control unit of the magnetic tape recorder means or from a control unit 26 fashioned as a microcomputer. The actual position in which the magnetic head 1 is respectively situated is stored in a memory 18 or can likewise be stored in the microcomputer 26.

At the beginning of the operation of tee magnetic tape recorder, the magnetic head 1 is brought to a reference position which is identified by a reference position generator 25. For example, this reference position is an outer edge of the magnetic tape 2 which is identified by a method as disclosed in German published application No. 31 12 886. The reference position can also be a first, for example, outer or center track of the magnetic tape 2, or as disclosed in U.S. Pat. No. 4,313,141, incorporated herein by reference, can be a specific position of the positioning means which is recognized by means of a light barrier. This reference position is then the actual position and is stored in the memory 18. The microcomputer 26 contains an allocator which contains the positional value of a track to be assumed. Both the rated positional value output by the allocator as well as the actual position value output by the memory 18 are supplied to a comparator 20 which identifies the distance both with respect to amount as well as with respect to direction from the difference between the rated and the actual position values, and initiates the pulse generator 21 to output pulses for the stepping motor 9 to the motor control 15 until the rated positional value and the actual positional value coincide. The magnetic head 1 is then positioned to the desired track by use of the motor 9. At the same time, the pulses are supplied to the memory 18, so that this contains the new actual position. For this purpose, the memory 18 can contain an adder which subtracts the corresponding plurality of pulses from the new actual position, or adds them theretO. It can alSO be fashioned as a counter whose counter reading indicates the respective actual position and which is respectively incremented or deincremented by the pulses output by the pulse generator 21.

As already mentioned, the motor 9 can also be designed as a DC motor. For exact positioning, a timing disc can be arranged on the shaft of the DC motor in this case, a plurality of slots in this timing disc being read by opto-electronic elements. In this case, the pulse generator 21 emits signals to the motor control 15 until a prescribed plurality of clock pulses has been read, this plurality corresponding to the difference between the rated and the actual position.

For the identification of the first correction value b+c, the microcomputer 26 first forwards the positional value for recording a track (which is allocated to the write head W) to the comparator 20. The motor control 15 then continues to output pulses to the motor 9 until the write head W is positioned to the corresponding track. Subsequently, the microcomputer 26 emits control signals S1 to a write control 28, these control signals F1 effecting the recording of signals onto the magnetic tape 2 by means of the write head W. Subsequently, the microcomputer 26 emits control signals S2 to the pulse generator 21 so that the generator 21 alternately moves the magnetic head 1 toward the top and toward the bottom. Thus, the read head R is moved over the edges of the recorded track. A read control 27 thus receives read signals from the read head R and, by use of control signals S3, the microcomputer 26 recognizes the positional values of the edges of the track and identifies the positional value of the center of the track. The first correction value b+c results from the difference between this positional value and the positional value allocated to the write head W.

For the identification of the second correction value, the microcomputer 26 can output a signal to the drive arrangement (not shown) of the magnetic tape 2. This signal causes the reverse of the moving direction of the magnetic tape. It can repeat the same procedure in order to find the center of the track by means of the read head R. The microcomputer 26 can identify the lateral offset of the magnetic tape 2 dependent on the moving direction of the magnetic tape 2. It can identify this from the difference between the two positional values.

For the identification of the third correction value a which corresponds to the deviation of the distance of the two head systems, the microcomputer 26 emits a control signal S4 to the pulse generator 21 after identifying and storing the positional value of the center of the track. This control signal S4 causes a positioning of the read head R to a track recorded by the write head W1 of the neighboring head system. The read head R identifies the center of this track and the third correction value a is calculated from the difference between the positional values of the centers of both tracks and from the first correction value.

The identification of the correction values can be carried out when the magnetic tape recorder is manufactured, during maintenance, or can be automatically carried out by the microcomputer 26 from time to time.

Dependent upon whether a broad or a narrow write head and whether a narrow or a broad read head are employed, the correction values are subsequently taken into consideration in the positioning during normal operation of the magnetic tape recorder.

When recording the reference track RT, the correction is required only at the broad write head W. In this case, the correction value b+c is added to the distance D0 in order to record the reference track RT exactly on the magnetic tape 2.

When reading a track, the correction value b+c is to be subtracted from the respective positional value allocated to the write head W in order to exactly position the read head R to the track.

As warranted, the respective second correction value is also taken into consideration in a corresponding way.

When recording the tracks T and T1 in accordance with FIG. 7, the third correction value a is taken into consideration, so that the distance between the tracks T and T1 amounts to precisely D. In addition, the first correction values b+c or b1+c1 are likewise taken into consideration here, and the second correction value may also be taken into consideration.

Although various minor changes and modifications might be proposed by those skilled in the art, it will be understood that I wish to include within the claims of the patent warranted hereon all such changes and modifications as reasonably come within my contribution to the art.

I claim as my invention:

1. A method for exact positioning of a magnetic head to a desired track on a magnetic tape in a magnetic tape recorder wherein the magnetic head is displaceable back and forth perpendicularly with respect to a moving direction of the magnetic tape, and wherein the magnetic head has at least one write head and one read head spaced apart from said write head, comprising the steps of:
    defining a reference position;
    placing the magnetic head at a fixed position on the tape and obtaining a first positional value of the magnetic head with respect to said reference position and storing said first positional value;
    by use of the write head, recording signals on one track on the moving magnetic tape while keeping the magnetic head at said fixed position;
    by use of the read head, identifying a center of said one track by displacing the magnetic head perpendicularly to a moving direction of the magnetic tape as the magnetic tape is moving so as to sense with the read head opposite side edges of said one track and then identifying the center of the track between the said edges;
    obtaining a second positional value of the magnetic head with respect to said reference position when the read head is positioned at the center of said one track;
    identifying a first correction value from a difference between the first and second positional values; and
    utilizing said first correction value when positioning the magnetic head to a desired track, said first correction value compensating for misalignment between a center of the write head and a center of the read head with respect to said tape moving direction.

2. A method according to claim 1, wherein said reference position is an edge of the tape determined by moving the head perpendicularly off of the tape and then back onto the tape while recording a track with the write head and detecting the track appearance at the edge of the tape with the read head.

3. A method according to claim 1 for identifying a variation in position of the magnetic tape dependent on the moving direction of the tape, including the steps of:
    reversing the moving direction of the magnetic tape after determining said first correction value;
    identifying a center of said one track by detecting the opposite side edges of the track by use of the read head;
    with a magnetic head at the center of the track storing a third positional value of the magnetic head relative to said reference position; and
    identifying a second correction value from a difference of the second and third positional values respectively allocated to the center of said one track moving in the initial direction and the center of said one track moving in the reverse direction.

4. A method according to claim 1 wherein the magnetic head has a first head system formed of the write head and of the read head, a second head system formed of a further write head and of a further read head, and wherein the first and second head systems are arranged at a given distance from one another perpendicular to the moving direction of the magnetic tape; and
    performing the steps of claim 1 for the first head system to obtain said first correction value for the first head system; and
    repeating the steps of claim 1 for the second head system to obtain a further first correction value for the second head system.

5. A system for exact positioning of a magnetic head to a desired track on a magnetic tape in a magnetic tape recorder, comprising:

means for displacing the magnetic head back and forth perpendicularly with respect to a moving direction of the magnetic tape, and said magnetic head having at least one write head and one read head spaced apart from said write head;

means for defining a reference position;

means for placing the magnetic head at a fixed position on the tape and obtaining a first positional value of the magnetic head with respect to said reference position, and means for storing said first positional value;

means for recording signals, with the write head on one track on the moving magnetic tape while keeping the magnetic head at said fixed position;

means for identifying with the read head a center of said one track by displacing the magnetic head perpendicularly to a moving direction of the magnetic tape as the magnetic tape is moving so as to sense with the read head opposite side edges of said one track, and then identifying the center of the track between the said edges;

means for obtaining a second positional value of the magnetic head with respect to said reference position when the read head is positioned at the center of said one track;

means for identifying a first correction value from a difference between the first and second positional values; and means for utilizing said first correction value when positioning the magnetic head to a desired track, said first correction value compensating for misalignment between a center of the write head and a center of the read head with respect to said tape moving direction.

* * * * *